INVENTORS
ERWIN ALLGAIER
KASPAR RITTER
BY

ATTORNEY.

2

United States Patent Office 3,190,362
Patented June 22, 1965

3,190,362
HYDRAULIC CONTROL MEANS FOR A LIFTING
DEVICE OF AGRICULTURAL TRACTORS
Erwin Allgaier, Boll, Kreis Goppingen, Wurttemberg, and
Kaspar Ritter, Kirchheim, Teckberg, Germany, assignors to Kopat Gesellschaft für Konstruktion, Entwicklung und Patentverwertung m.b.H. & Co. KG, Boll,
Kreis Goppingen, Germany, a corporation of Germany
Filed Aug. 12, 1963, Ser. No. 301,585
Claims priority, application Germany, Aug. 11, 1962,
K 47,479
6 Claims. (Cl. 172—4)

The present invention relates to hydraulic control means for a lifting device of agricultural tractors in general and to such control means in which the control pulses originate from a ground following member measuring the depth of penetration of an implement connected with the lifting device and in which also a manually operated lever for adjustment of the lifting device is provided.

The known hydraulic control means use, as a rule, the forces occurring at the upper connecting point of a three-point linkage serving in connection with the soil working implement as a giving value for the automatic adjustment of the lifting device in a lifting or lowering direction for such an amount, that the pulling force exerted by the tractor upon the implement is as much as possible constant.

The known hydraulic control means permit simultaneously an application for an automatic position control, in which the implement is automatically returned into a pre-selected position relative to the tractor by the setting of a manually operated lever, if it is turned, for instance, during passing of a soil "valley."

Finally, the known hydraulic control means have also a so-called "swimming position" in which the load arms of the lifting device perform freely an angular movement due to the pressure equalization between both sides of the working piston.

It is, however, not possible with all devices using the pulling force as a giving value for the automatic control of the lifting devices, to control an implement connected with the lifting device independently from the changing soil resistances and soil unevenness with the desired exactness to constant soil penetration depth.

In order to comply with this basically most important requirement for an automatic lifting device control, it has been also proposed already, to provide different depth controls by using a sensing member continuously observing the penetration depth as the giver for the adjustment of the lifting device. In a known control device of this type, described, for instance, in Patent No. 2,714,346 to M. E. Valin, dated August 2, 1955, the deviations in the position of the ground following sensing member are transmitted to the adjusting mechanism for a pressure pump with controllable feeding volume, which pressure pump is also adjustable by a separate manually operated lever by means of a joint coupling. This known control device is not simultaneously applicable, however, for the position control of the lifting device, in which the load arms of the lifting device and the implements suspended from the latter are returned automatically into the same angular position determined by the setting of the manually operated lever, from which position they were moved due to conditions prevailing on the outside. A further drawback of the last described known control means resides in the fact that the pressure pump with adjustable feeding volume is required to maintain continuously the pressure working fluid required for the retaining of the implement and, therefore, its axial bearings are highly charged even with a small feeding volume.

It is the main object of the present invention to provide a hydraulic control means for a lifting device of agricultural tractors, which combines the functions of a "depth control" and of a "position control," as well as the possibility of setting the lifting device in a "swimming position" by using of a pump working only the adjustment period against a higher working pressure with little constructive requirements and which, preferably, is determined for use in connection with an automatic control for the traveling speed of the tractor, as disclosed in the co-pending patent application Serial No. 291,525, filed June 28, 1963.

It is another object of the present invention to provide a hydraulic control means for a lifting device of agricultural tractors, wherein a ground following sensing member for the soil penetration depth is connected at least over a part of the same control linkage with the same control member of the lifting device, which serves, upon switching off of the depth control, the automatic adjustment of the lifting device to any angular position of the arms of the lifting device pre-selectable by the manually operated lever, that means in the form of a so-called "position control." It has been achieved by such arrangement to make useable the lifting device selectively for the automatic depth control of a soil-working implement, preferably, for plowing or for the automatic position control, first of all in connection with soil-working devices carried completely by the tractor, by using the same control means and at least one part of the same control linkage.

A further important advantage of the hydraulic control means, designed in accordance with the present invention, resides in the fact that the lifting device can be operated for its different functions by means of a single operating lever, which arrangement simplifies considerably the operation and also the entire structure.

It is a further object of the present invention to provide a hydraulic control means for a lifting device of agricultural tractors, wherein the hydraulic control means are designed such, that the returning device for the arms of the lifting device for the position control comprises a double lever, one end of which is connected with the control linkage of the control apparatus for the lifting device, and the other end of which is maintained in an intermediate position by means of springs, which other end is pivotally connected to a guide rod, while its bearing pin disposed therebetween is adjustable, for instance, by means of a guide for the bearing pin corresponding with the angular deflections of the load arms of the lifting device. By such arrangement a particular simple structure of the return setting device of only few rough structural elements results, which is of greatest importance for a longer operation of the hydraulic control means free of disturbances.

It is yet another object of the present invention to provide a hydraulic control means for a lifting device of agricultural tractors, wherein the control apparatus for the lifting device has in known manner a change-over apparatus which closes at each adjusting impulse of the setting member in the direction "lifting" at first the flow of the working fluid into the return conduit which is continuously under a comparatively low filling pressure, and upon termination of the adjustment movement opens again automatically. In this manner, it is only necessary that the pressure pump feeds the working fluid during the greater portion of its working period only against the comparatively low pressure of, for instance, 5 to 7 atmospheres, which pressure suffices for the operation of the change-over apparatus in the control device, and also as filling pressure for a hydrostatic device fed, preferably, from the same pump with the required working fluid for the equalization of any losses. The extensive shortening of the operation periods obtained thereby, in which periods the pressure pump must feed against the comparatively high pressure for the operation of the lifting device in the direction of lifting, works to an appreciable reduction of the median pump driving power with corresponding less heating of the working fluid, and also leads to an increase of the life of the pump.

It is still a further object of the present invention to provide a hydraulic control means for a lifting device of agricultural tractors, wherein the change-over apparatus for the pressure in the working fluid has an additional switch piston, which sets automatically the control device into the zero position upon overreaching a highest pressure determined by the setting of a safety valve. By such arrangement of the control device, it is brought about, first of all during its use for the operation of one or a plurality of additional hydraulic working devices, as for instance, of a front loader or the like, that the counter pressure to be overcome by the pressure pump is automatically reduced again to the low feeding pressure upon engagement of the working cylinder on an abutment, while the filled state of the working cylinder is maintained up to the switching over of the control apparatus to the lowering position.

It is, however, also a further object of the present invention to provide a hydraulic control means for a lifting device of agricultural tractors, which includes an additional linkage connecting the manually operated lever for the lifting device with a double lever of the return apparatus, which linkage locks during the setting of the lifting device to the so-called "swimming position" by pressure equalization between the working cylinder and the crank housing of the lifting device, the return apparatus on the lifting device, so that the possibility is created, to switch the lifting device by simple further advancement of the manually operated lever beyond the "lowering position" to the "swimming position," in which the arms of the lifting device can be set manually without any nominal resistance into any selected angular position, for instance, for the attachment of the implements to be connected.

It is finally also another object of the present invention to provide a hydraulic control means for a lifting device of agricultural tractors, wherein a conventional change-over valve is disposed in the connecting conduit between the control apparatus and the lifting device, for the selected operation of one or a plurality of additional hydraulic working implements by means of the same control apparatus. The arrangement of such change-over valve is to be considered as part of the present invention only in connection with the other elements of the hydraulic control means of the present invention.

With these and other objects in view, which will become apparent in the following detailed description, the present invention will be clearly understood in connection with the accompanying drawings, in which:

FIG. 1a is a fragmentary elevation of the plow connection;

Figure 1:
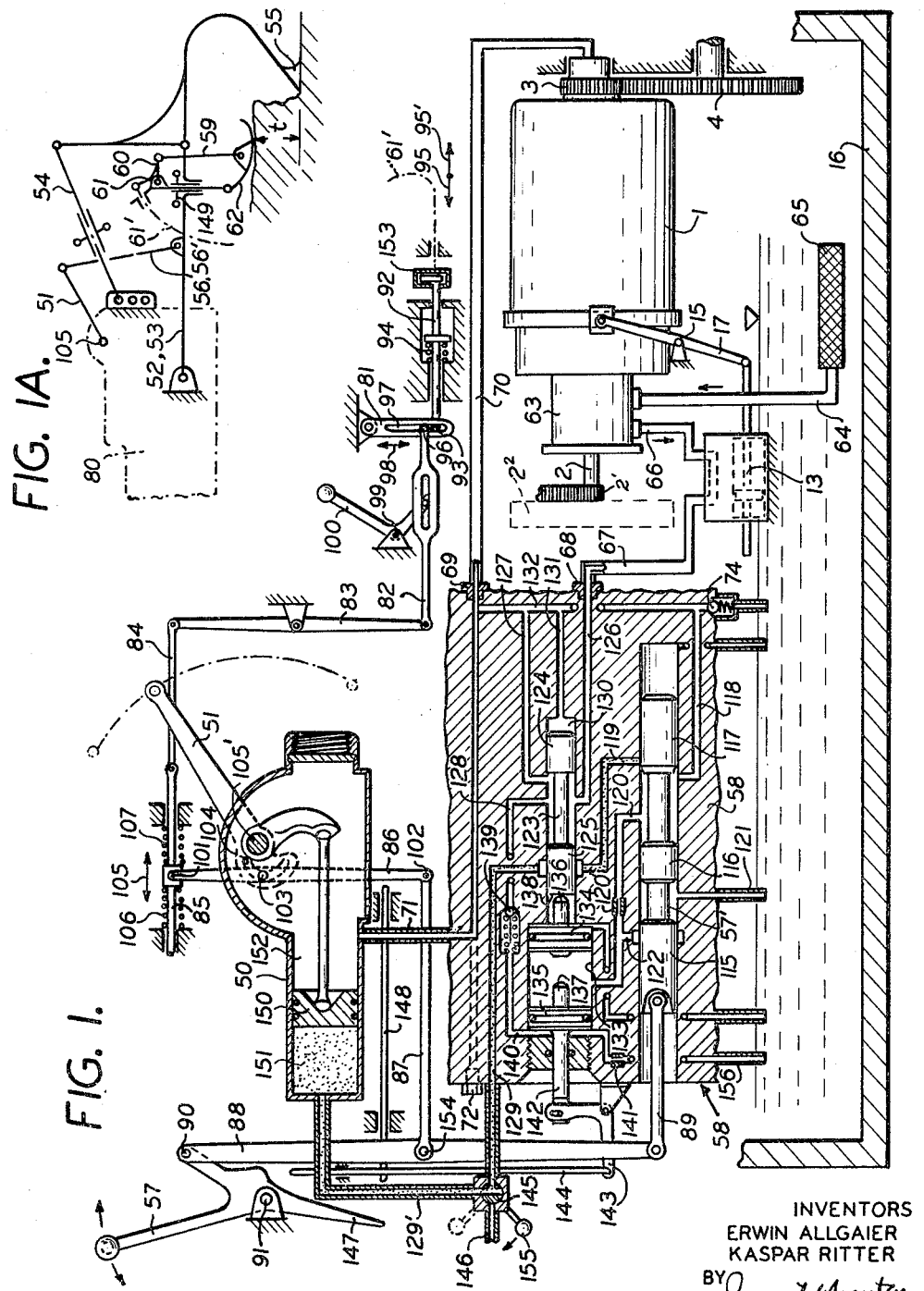
FIGURE 1 is a schematic elevation, partly in section, of the hydraulic control means designed in accordance with the present invention, the lifting device and the corresponding control apparatus being shown in longitudinal section with the manually operated lever indicated in zero position.

Referring now to the drawings, the hydraulic control means comprises a hydraulic lifting device 50 having load arms 51, a control apparatus 58 for the lifting device 50 having a manually operated gripping member 57 and a pressure pump 63 driven, for instance, by means of an input shaft 2 of an endlessly adjustable drive 1 equipped with a reduction output gear drive 3 and 4, the input shaft 2 bearing a splined end 2', by which it is in engagement with a motor fly wheel $2^2$. On the rear carriage 80 of the tractor, shown in point-dotted lines, a plow 55 is connected by means of a three-point linkage 52, 53 and 54 and a lifting linkage 56 and 56' connecting the lower links 52 and 53 with the load arms 51 of the lifting device 50, such that the plow 55 can be lifted by means of the lifting device 50 and can be lowered thereby again. Furthermore, a ground following sensing member 62, adjustable as to its height, is secured to the links 52 and 53, which ground following sensing member 62 transmits over a linkage 59, 60 and 61, an intermediate lever 81 and additional linkage 82, 83, 84, 85, 86 and 87 each deviation from the selected soil penetration depth $t$ of the plow 55 as a control pulse over an intermediate lever 88 and an additional connecting rod 89 to a control valve 57' in the control apparatus 58 of the lifting device 50. The link 87, the intermediate lever 88 and the connecting rod 89 serve hereby simultaneously as transmission means of the different control pulses, delivered from the manually operated lever 57, to the control valve 57' of the control apparatus 58 of the lifting device. The pivot pin 90, which connects the intermediate lever 88 with the manually operated lever 57 retained against non-intended rotation about its bearing pin 91 by means of a friction brake, operates as rotary point for the intermediate lever 88, upon switched-on automatic depth control, for instance, by a simple coupling of a Bowden cable 61' with the intermediate lever 81 by means of a rod 92, which projects by means of a pin 93 into the slot 97 of the intermediate lever 81 and is maintained by means of a spring 94 at a pretension pressing the ground following sensing member 62 against the soil, so that all longitudinal movements of the Bowden cable 61' in one or the other direction of the double arrow 95 and 95' are transmitted by means of the intermediate lever 81, the linkage 82, 83, 84, 85, 86 and 87, the intermediate lever 88 and the connecting rod 89 as deflections in the same direction upon the valve 57' in the control apparatus 58 of the lifting device.

The transmission ratio between the deflections of the ground following sensing member 62 and of the control valve 57' can be changed by displacement of the engagement point 96 of the rod 82 in the longitudinal slot 97 of the intermediate lever 81 in one or the other direction of the double arrow 98, for instance, by means of a lever 100 secured against non-intended deflections about its bearing pin 99 by friction, and, thereby, the response sensitivity of the automatic depth control can be chosen at will. The double lever 86 serving as return guide and connecting the rods 85 and 87 is secured pivotally to the rod 87 at the pivot point 102. The other end of the double armed lever 86 is pivotally secured to the rod 85 at the pivot point 101, which rod 85 is guided for longitudinal movement in the direction of the double arrow 105 and is maintained in the position shown in full lines by means of comparatively weak springs 106 and 107.

A pin 103 provided on the double armed lever 86 projects into a guide 104 connected with the load arm 51 of the lifting device 50 which guide 104 is disposed eccentrically to the rotating axis 105' of the load arm 51.

The control apparatus 58 of the lifting device 50 comprises, in addition to the control valve 57' movable from the outside by means of the connecting rod 89 with the three control faces 115, 116 and 117 for the selective closing and opening, respectively, of channels 118, 119, 120, 121 and 122, also a change-over valve 123 having the control faces 124 and 125 for the respective channels 126, 127, 128 and 129. The right end of the bore or cylinder 130 for the change-over valve 123 is in communication with a return conduit 132 by means of a channel 131, in which return conduit 132 a comparatively low pressure of 5 to 7 atmospheres is maintained during the operation of the pressure pump 63 by means of a safety valve 74, which pressure of 5 to 7 atmospheres is also required for the operation of the drive 1 with working fluid by means of a feeding conduit 70, for replacement of losses and maintaining of the lubrication. In a bore 133 of enlarged diameter disposed coaxially to the bore 130 for the change-over valve 123 are sealingly guided two switch pistons 134 and 135, which switch pistons are in operative connection directly and indirectly, respectively, with the left end face 138 of the change-over valve 123 by means of pins 136 and 137, respectively. The control apparatus 58 for the lifting device 50 includes also a valve 139 limiting the highest permissible pressure in the conduit 128, a return conduit 140 leading through the left end of the bore or cylinder 133 and a throttle 141 through a conduit 156 into the sump of a housing 16. The switch piston 135 has an extension 142 projecting from the control apparatus 58, which extension 142 is operatively connected with the manually operated gripping member 57 by means of an angular, double armed lever 143 and a connecting rod 144, such that upon movement of the switch piston 135 toward the right, the manually operated gripping member 57 is returned automatically from its lifting position into its zero or neutral position. A change-over valve 145 is also disposed in the pressure conduit 129 and 129', leading from the control apparatus 58 to the lifting device 50, for selectively connecting one or a plurality of additional hydraulic implements by means of a conduit 146 providing connection with the control apparatus 58. The crank housing of the lifting device 50, which is continuously filled with working fluid, is connected with the filling conduit 70 for the endlessly controllable drive 1 by means of a conduit 71.

A connection 72 is provided for an additional conduit on the control apparatus 58 through which working fluid subjected to filling pressure can be fed, for instance, to an implement for the automatic adjustment of the transmission ratio in the drive 1. The manually operated gripping member 57 is also equipped with an extension 147 which maintains the lower end of the double armed lever 86 in its right end position, upon setting the "swimming position" of the lifting device 50 by its movement into the left end position by means of a pressure rod 148, whereby the pressure spring 106 remains in its tensioned position.

Upon elimination of the return for the automatic depth control, the rod 82 of the linkage can be connected directly at the lower pivot 102 of the double armed lever 86 with the rod 82 upon removal of the change-over lever 83 and of the rod 84.

The hydraulic control means described above operates in the following manner for the different operating conditions:

(I) *Automatic depth control*

Figure 2:
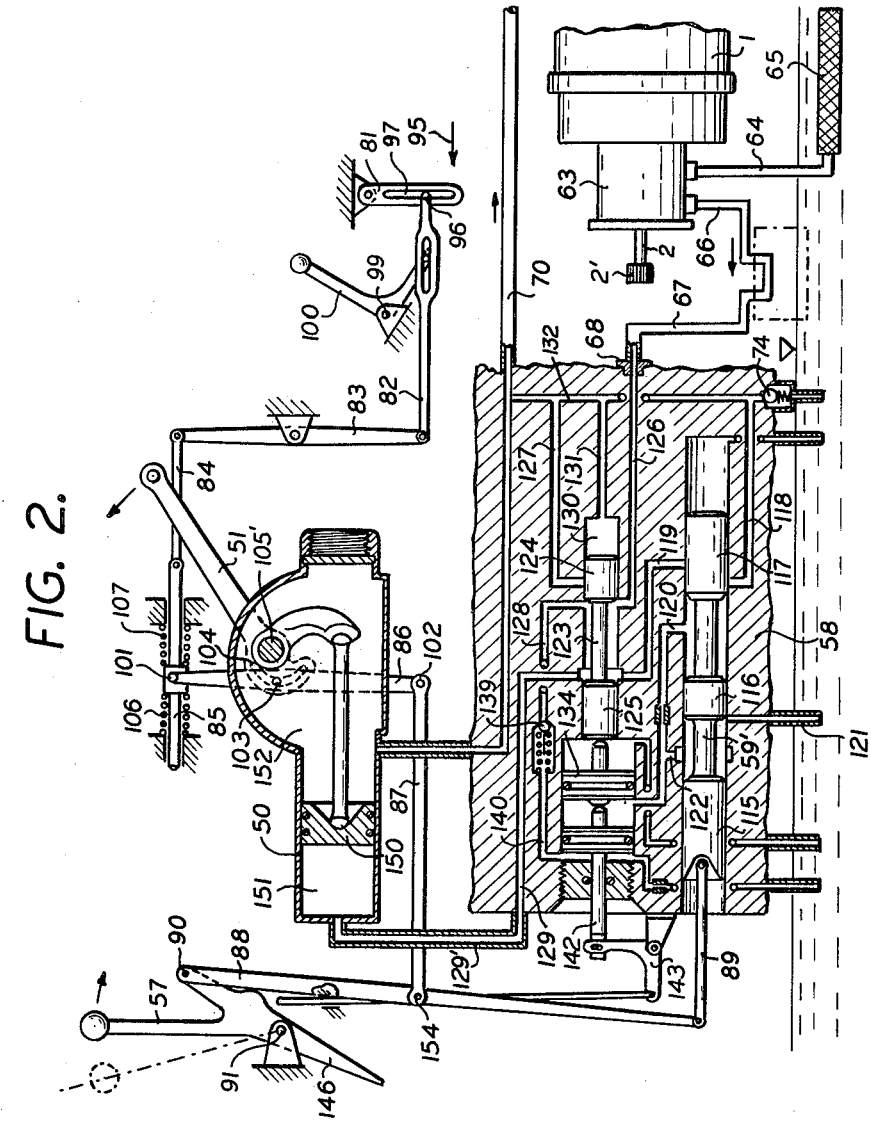
FIG. 2 is an elevation, partly in section, of the hydraulic means disclosed in FIG. 1, however, with the manually operated lever shown in the position "lifting"
Figure 3:
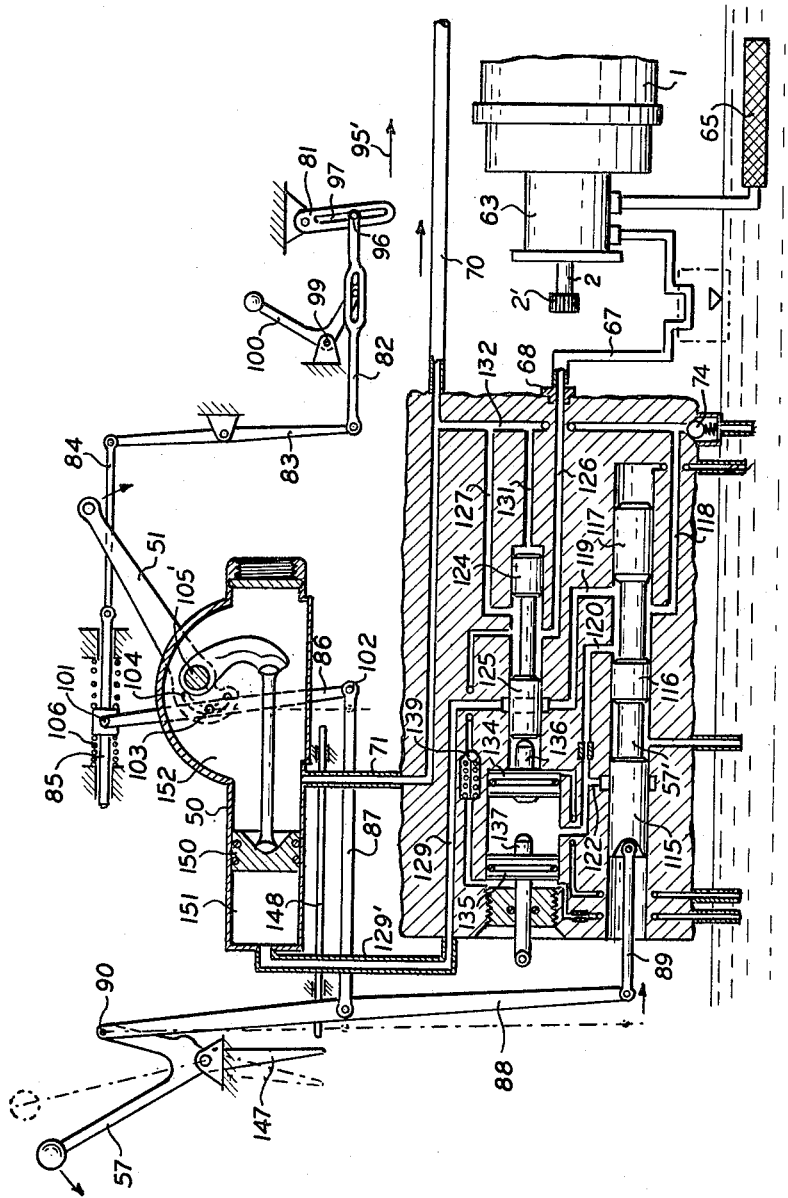
FIG. 3 is an elevation, partly in section, of the same arrangement as shown in FIG. 2, however, the manually operated lever being shown in position "lowering."

Upon securing of the connection between the end of the Bowden cable 61' and the rod 92 secured to the intermediate lever 81, the control valve 57' in the control apparatus 58 of the lifting device 50 is moved from its intermediate position, shown in FIG. 1, towards the left or towards the right into one of the positions shown in FIGS. 2 and 3, respectively, upon each variation of the penetration depth *t* of the plow 55. In the center position of the control valve 57', as shown in FIG. 1, the change-over valve 123 is in the shown right end position, since due to the pressure balance between the right end face of the valve 123 and the left end of the switching piston 134 having larger diameter, a resultant force effective towards the right is exerted upon the change-over valve 123. The working fluid is fed to the pressure pump 63 from the sump in the housing 16, which is under atmospheric pressure, through a suction conduit 64 passing a filter 65, and from the pressure pump 63 to the control apparatus 58 of the lifting device 50 by means of the pressure conduits 66 and 67, preferably, through an intermediate adjusting device 13, as disclosed in Patent No. 3,046,744, dated July 31, 1962, for the endlessly controllable drive 1 at the entrance flange 68 of the control apparatus 58, the operation of the adjusting device being more clearly disclosed in Patent No. 3,046,744, dated July 31, 1962. The working fluid is fed from here through the channel 126 into an annular chamber defined between the control pistons 124 and 125 of the change-over valve 123 and from the annular chamber through a channel 127 to a return conduit 132 and then through the filling conduit 70 to the drive 1 and partly through a safety valve 74 adjusted to a pressure of 5 to 7 atmospheres into the sump of the housing 16. The left side of the switching piston 134 is likewise in communication with the return conduit 132 through a channel 118 and an annular chamber defined between the pistons 116 and 117 of the control valve 57', as well as through a channel 120 connecting the annular chamber with the chamber on the left side of the switching piston 134, while the right end face of the change-over valve 123 is connected with the return conduit 132 through a channel 131. A conduit 122 branching off the channel 120 upstream relative to a throttle member 120' disposed in the channel 120 is closed in the center position of the control valve 57' by its piston 115. As soon as the plow 55 deviates downwardly from the soil penetrating depth *t* chosen by setting an adjustment spindle 149, the control valve 57' in the control apparatus 58 of the lifting device 50 is displaced towards the left by the sensing member 62 over the linkage 59 and 60, the Bowden cable 61, the rod 92 and the links and levers, respectively, 81, 82, 83, 84, 85, 86, 87, 88 and 89 until the piston 115 releases the communication between the channel 122 and a return conduit 121, leading from the annular chamber defined between the pistons 115 and 116 into the sump of the housing 16, while the piston 117 maintains the channel 119 in closed position. Due to the pressure drop caused thereby on the left side of the switching piston 134, the change-over valve 123, the right end face of which is subjected still through the channel 131 to the working fluid under filling pressure, moves as far towards the left into the position shown in FIG. 2, that the piston 124 closes the channel 127 and the piston 125 releases the communication between the channel 126 and the pressure conduits 129 and 129', respectively.

The pressure medium fed by the pressure pump 63 flows now into the working cylinder 151 of the lifting device 50 with a pressure rise corresponding to the prevailing adjustment force and displaces the piston 150 in the working cylinder 151 simultaneously lifting the plow 55 by means of the arm 51 of the lifting device 50 until the plow 55 has resumed the set penetration depth *t* and the control valve 57' returns into its center position shown in FIG. 1 by means of the above described linkage means.

Upon lowering of the soil penetrating depth *t* of the plow 55, the control valve 57' in the control apparatus 58 of the lifting device 50 is displaced by the same linkage means in opposite direction towards the right into the "lowering position," as shown in FIG. 3 of the drawing. Here, the preferably conically inclined left edge of the piston 117 releases the fluid path leading to the cylinder 151 of the lifting device 50 through the channels 119, 129 and 129' and thus provides a direct communication with the crank housing 152, likewise subjected to the filling pressure of the working fluid through the conduits 118, 132 and 71, until the return double lever 86 assumes the position shown in point-dotted lines under the influence of the return stroke of the rod 85 supported by the spring 106 upon deeper penetration of the plow 55 and of the simultaneously occurring displacement of the bearing pin 103 by means of the guide 104 during the upward swinging of the load arms 51, in which position the control valve 57' resumes again the zero or neutral

Combined depth and position control

As it has been set forth above, the pivot bolt 90, which connects the double armed lever 88 with the manually operated gripping member 57 during the automatic depth control in response to the control pulses transmitted from the ground following sensing member 62, is the rotary point for the double armed lever 88. The soil penetration depth can be varied from the driver seat of the tractor within certain limits by small inclinations of the manually operated gripping member 57 from the neutral position into lifting or lowering direction during switched-on depth control, without changing the position of the ground following sensing member 62 relative to the plow 55 by means of the adjusting spindle 149. The plow 55 can be completely lifted and again lowered, respectively, for instance, for turning the tractor, in spite of the switched-on automatic depth control by complete inclinations of the manually operated gripping member 57 in the lifting and lowering direction, respectively, whereby the control pulses transmitted from the ground following sensing member 62 are canceled out.

Position control

By separation of the connection 153 between the Bowden cable 61 and the rod 92, the automatic depth control can be put out of operation at any time and the hydraulic control means can be used as a pure position control. In this case the control apparatus 58 of the lifting device 50 operates in exactly the same manner with the lifting device 50 as it has been set forth above in connection with FIGS. 1 to 3 during the description of the depth control with the exception, however, that the transmittances for the adjustment of the piston 150 of the lifting device 50 and of the load arms 51 operatively connected with the latter are given by deflections of the manually operated gripping member 57 from the center position shown in FIG. 1 into the lifting position shown in FIG. 2 and into the lowering position shown in FIG. 3, respectively. The deviations of the manually operated gripping member 57 are transmitted in this case to the control valve 57' by swinging the double-armed lever 88 about the pivot point 154 on the rod 87, which control valve 57' returns into the center position in the manner set forth above upon reaching a swinging angle of the load arms 51 corresponding to the prevailing deviation on the manually operated gripping members 57 through the return double-armed lever 86. If the load arms 51 are turned upwardly by an outside force, which is exerted upon the soil working implement connected with the three-point linkage 52, 53, 54, the lower pivoting point 102 of the double armed lever 86, which pivoting point 102 is displaced towards the right by means of the bearing pin 103 guided in the eccentric control slot 104 and the control valve 57' is adjusted likewise towards the right into the direction "lowering" by means of the double-armed lever 88 and the rod 89, until the load arms 51 have returned to their angular position pre-selected by the inclination of the manually operated gripping member 57.

Swimming position

By adjustment of the manually operated gripping member 57 beyond the "lowering" position, shown in FIG. 3, the lower pivot point 102 of the return double-armed lever 86 can be displaced towards the right, as already set forth above, by means of a projection 147 of the manually operating gripping member 57 and a pressure rod 148 by the compression of the return spring 106 to a point that due to the elimination of the effect of the return stroke of the double armed lever 86 the communication connection between the working cylinder 151 and the crank housing 152 of the lifting device 50 remains unimpaired, until the manually operated gripping member 57 is returned again from the "swimming" position.

Control of additional hydraulic implements

By simple turning of the change-over valve 145 in the connecting conduits 129 and 129' between the control apparatus 58 and the lifting device 50 into the position of the manually operated handle 155, shown in point-dotted lines, the manually operated gripping member 57 and the control apparatus 58 can be applied in the same manner as described above also for filling and emptying, respectively, of one or a plurality of additional one-sided operating working cylinders, for instance, for the operation of a front loader or the like through a conduit 146. In order to avoid in such operations a longer feeding by the pressure pump 63 against very high pressures, which are created as soon as the pistons working in the working cylinders reach their end positions, the second switching piston 135 is provided in the control apparatus 58. The switching piston 135 is subjected, upon response of a safety valve 139 disposed in the conduit 128 and set to the highest permissible working pressure, at its left side to a pressure determined by a throttle 141 disposed in the return conduit 156 and is thereby moved towards the right.

During this movement the switching piston 135 displaces by its projection 137 the switching piston 134 and its extension 136 the change-over valve 123 into the zero position, as shown in FIG. 1. Simultaneously, the manually operated gripping member 57 is likewise returned to its zero position by the extension 142 of the switching piston 135, the double-armed angular lever 143 and a pushing rod 144. By such arrangement the pump pressure is automatically lowered to the filling pressure determined by the spring pressure of the safety valve 74 and due to the return of the control valve 57' into its zero position by means of the double-armed lever 88 and the rod 89 the pump pressure is maintained at the required level for the filling pressure. In the same manner, the control apparatus 58 and the manually operated gripping member 57 are automatically returned into their zero positions by means of the switching piston 135, as soon as the piston 150 of the lifting device 50 closes the return conduit 71 upon reaching the greatest permissible deviation of the load arms 51 in the direction "lifting," whereby, in the working cylinder 151, a pressure is obtained which is built up in the conduits 128 and 129 to a pressure surpassing the spring pressure of the safety valve 139.

While we have disclosed one embodiment of the present invention, it is to be understood that this embodiment is given by example only and not in a limiting sense, the scope of the present invention being determined by the objects and the claims.

We claim:

1. A hydraulic control means for lifting devices of agricultural tractors, comprising
   a tractor,
   an implement pivotally secured to said tractor,
   a lifting device having swingable load arms pivotally connected with said implement and a control apparatus mounted in said tractor,
   cam means rotatable with said load arms,
   said lifting device being operatively connected with said control apparatus,
   said control apparatus including means for automatically adjusting said lifting device into any one of a plurality of angular positions of said load arms,
   a ground following sensing member operatively connected with said lifting device and
   means for transmitting to said control apparatus from said ground following sensing member variations of the soil penetration depth of said implement,
   said transmitting means including a lever operatively connected with said rotatable cam means intermediate its ends, said transmitting means further including first linkage means extending from said ground following sensing member to one end of said lever, second linkage means operatively connecting the other end of said lever with said control apparatus, and said adjusting means of said lifting device including a manually operated lever operatively connected with said second linkage means and preselecting the angular position of said load arms.

2. The hydraulic control means, as set forth in claim 1, wherein
said first linkage means includes a guide rod connected with said one end of said lever,
resilient means engaging said guide rod and maintaining said one end of said double-armed lever in a center position, and
said lever having a bearing pin intermediate its ends.

3. The hydraulic control means, as set forth in claim 2, wherein
said second linkage means includes an additional rod operatively connecting said manually operated lever for said lifting device with said lever,
said lifting device includes a crank housing and a working cylinder having a working piston reciprocating therein, and
said additional rod being adapted to lock said lifting device upon setting the latter into "swimming position" with a pressure balance between said working cylinder and said crank housing.

4. The hydraulic control means, as set forth in claim 1, wherein
said control apparatus includes a control valve axially movable in a pressure cylinder,
the latter being subjected to an axial movement by adjustment pulses emitted from said member in response to position changes of said implement,
conduit means feeding a pressure medium into and bleeding the latter from said pressure cylinder, respectively, and
said control apparatus including a change-over device and a return conduit comprising means for closing said return conduit upon each displacement of said control valve in the direction "lifting" and for automatic opening of said return conduit after termination of said displacement.

5. The hydraulic control means, as set forth in claim 4, wherein
said change-over device comprises a switch piston reciprocating in a pressure cylinder thereof,
said switch piston being responsive to a predetermined highest pressure determined by a safety valve disposed in said return conduit, and
means for returning automatically said manually operated lever and said control apparatus into the zero position by said switch piston.

6. The hydraulic control means, as set forth in claim 1, which includes
a connecting conduit disposed between said control apparatus and said lifting device, and
a change-over valve is arranged in said connecting conduit for selective operation of a plurality of implements by the same control apparatus.

References Cited by the Examiner

UNITED STATES PATENTS

| | | | |
|---|---|---|---|
| 2,363,235 | 11/44 | Ellinwood. | |
| 2,527,840 | 10/50 | Mott | 172—4 |
| 2,714,346 | 8/55 | Valin | 172—4 |
| 2,722,874 | 11/55 | Bopf | 172—9 |
| 2,996,125 | 8/61 | Bunting | 172—4 |

FOREIGN PATENTS 217,233   9/61   Austria.

ABRAHAM G. STONE, *Primary Examiner.*